Jan. 14, 1969   R. E. JACKSON ET AL   3,421,447
FLUID PUMP

Filed Oct. 26, 1966

ROBERT E. JACKSON
HARRY IDOINE
INVENTORS.

BY Lyon & Lyon
ATTORNEYS

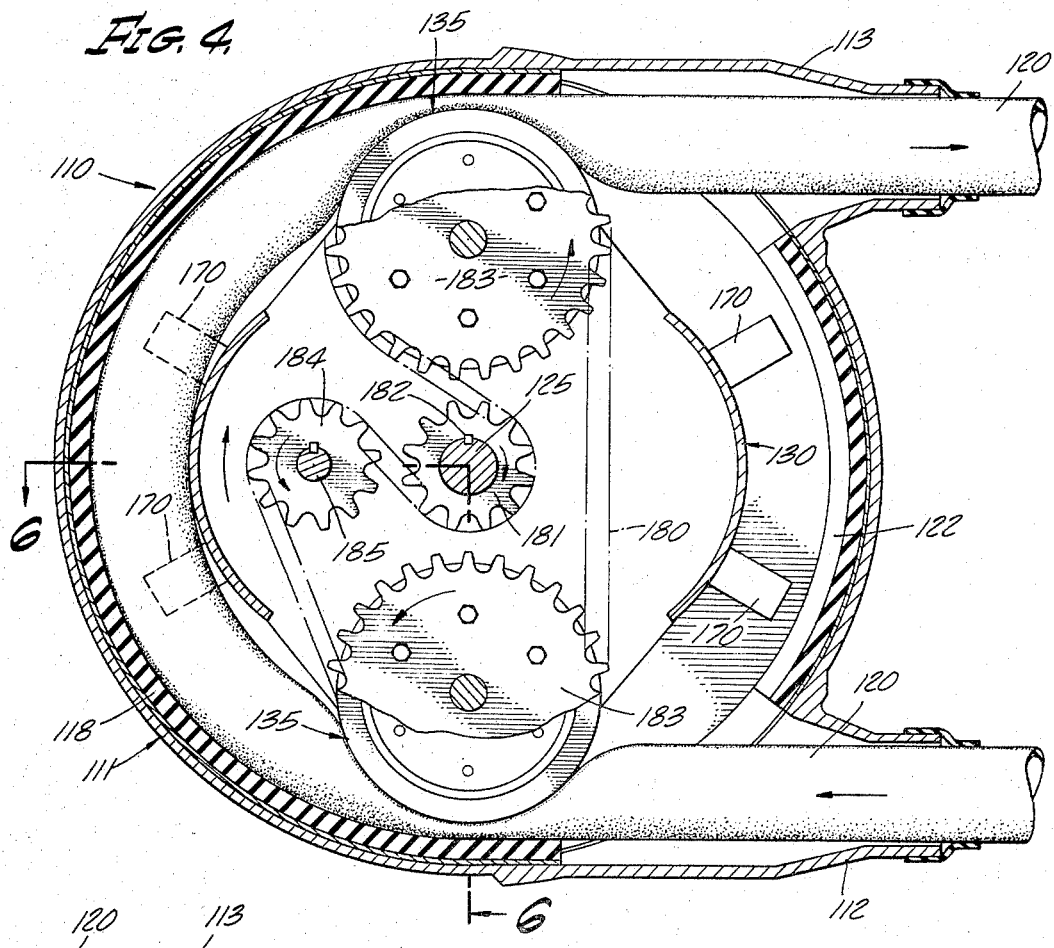

United States Patent Office 3,421,447
Patented Jan. 14, 1969

3,421,447
FLUID PUMP
Robert E. Jackson, Newport Beach, and Harry E. Idoine, Anaheim, Calif., assignors to Challenge-Cook Bros., Incorporated, City of Industry, Calif., a corporation of California
Filed Oct. 26, 1966, Ser. No. 589,682
U.S. Cl. 103—149      21 Claims
Int. Cl. F04b 43/08; F04b 9/02

ABSTRACT OF THE DISCLOSURE

A pump for fluids that are difficult to pump such as concrete wherein a deformable hose is mounted on the inner cylindrical surface of the pump housing, a central shaft rotatably supports a rotor frame on which a pair of diametrically positioned rollers are rotatably mounted to engage and deform the hose for pumping upon planetary movement, with the rollers being adjustable radially to establish the desired engagement and to accommodate wear of the rollers and hose, and a separate chain or combination chain and gear drive allowing such adjustment operably connects the rollers to the shaft to drive the rollers in the opposite direction as the shaft rotation whereby the rotor and shaft rotate in the same direction.

---

This invention relates to a fluid pump of the type employing a deformable hose pumping chamber which is progressively compressed by rollers for causing pumping and, in particular, the invention is directed to an improved drive arrangement of the moving components for producing improved operational characteristics.

Deformable hose type fluid pumps are employed primarily for pumping thick slurries and fluids containing solid materials, such as concrete, that present substantial difficulties in pumping through the more conventional piston or centrifugal type pumps. There are a number of conventional deformable hose type pumps which are successful to varying degrees. One typical deformable hose fluid pump is disclosed in U.S. Patent 3,180,272 and employs a cylindrical housing supporting the hose on its interior with orbiting driven rollers progressively and successively deforming the hose to force fluid therethrough. Since the hose deforming rollers are positively driven it is a common occurrence for the rollers to slip relative to the hose particularly when excessive pressures or obstructions are encountered thereby failing to produce the desired pumping and also causing wear on the exterior of the hose shortening its useful life. Other deformable hose fluid pumps have been constructed wherein the hose deforming rollers rotate freely and are orbited merely by rotating the frame or rotor upon which they are mounted but while this avoids the wear-inducing roller slippage of the driven roller type arrangement it lacks many of the other operational advantages thereof.

Accordingly it is a principal object of this invention to provide a novel form of deformable tube fluid pump wherein hose deforming rollers are positively rotated through a drive arrangement which induces rotation of the roller-supporting rotor in the proper direction thereby assisting the roller movement and virtually eliminating slipping rotation of the rollers relative to the deformable hose.

Another object of this invention is to provide a novel form of fluid pump employing a chamber which is collapsed by rollers to produce pumping and such rollers are driven both in their rotation and their progression along the chamber.

Still another object of this invention is to provide a novel form of drive arrangement for a deformable hose fluid pump employing orbiting rollers mounted on a rotor wherein the rotor is rotatably mounted on the input drive shaft and rotates in the same direction as the drive shaft without being affixed thereto.

A further object of this invention is to provide a novel form of deformable hose fluid pump wherein affirmatively driven rollers both deformably engage the hose and frictionally engage an adjacent surface for causing progressive movement along the hose to produce pumping and the roller drive is such as to cause rotation of the rotor to separately induce such progressive movement.

Still another object of this invention is to provide a deformable hose fluid pump employing orbiting rollers mounted on a rotor which is in turn rotatably mounted on the drive shaft wherein the rollers are driven through a power transmission means in the opposite direction as the drive shaft with the result that the rotor rotates in the same direcion as the drive shaft. A further object of this invention is to provide such a fluid pump wherein the transmission means combines a gear drive for reversing the direction of rotation and a chain drive for transferring such rotation. A further object is to provide still another embodiment of such fluid pump wherein the transmission means is comprised of a single chain reeved about multiple sprockets to produce both a reversal in the direction of rotation and a transfer of the drive.

Other and more detailed objects and advantages of this invention will appear from the following description and the accompanying drawings, wherein:

FIGURE 4 is a sectional elevation view similar to FIGURE 1 but illustrating a modified form of the fluid pump and drive means.

FIGURE 5 is an elevation view of the pump of FIGURE 4 viewed from the opposite side with a portion of the housing broken away to reveal the roller and chain drive adjusting means.

Figure 1:
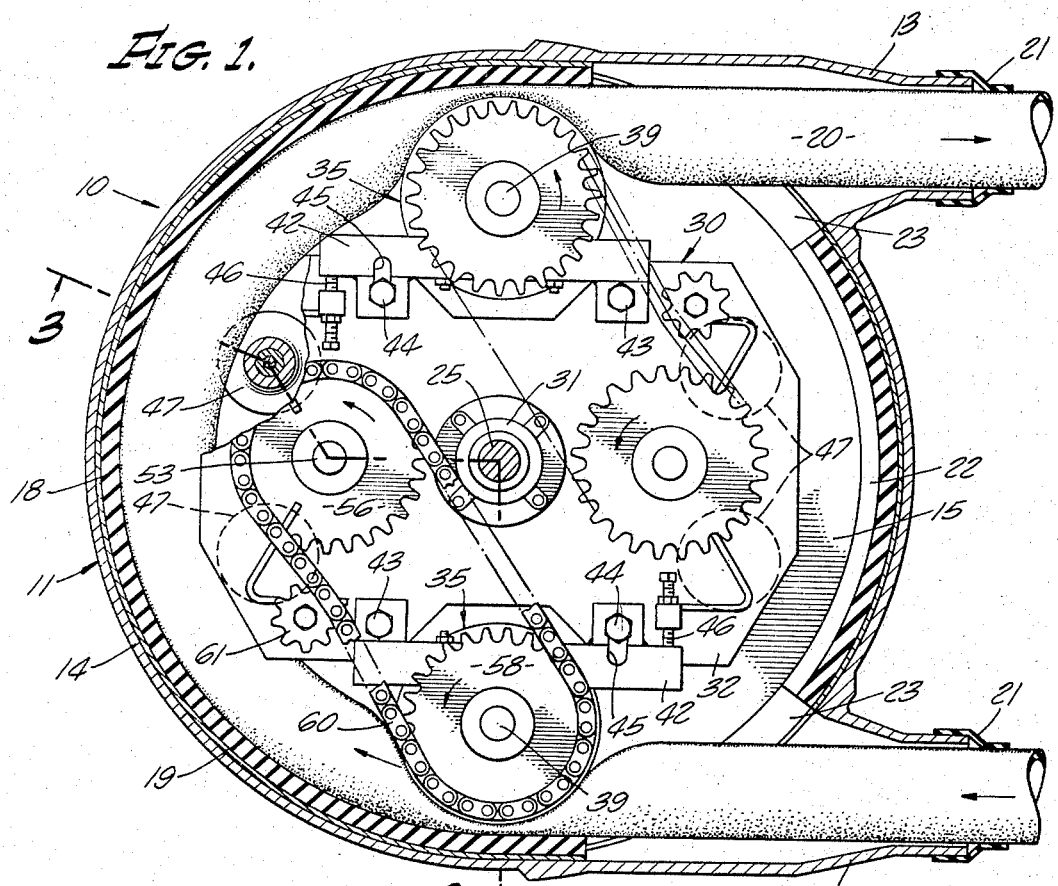
FIGURE 1 is a sectional elevation of the fluid pump of this invention taken near one side of the pump housing for illustrating the drive means on that side of the housing and the mounting of the hose deforming rollers.
Figure 2:
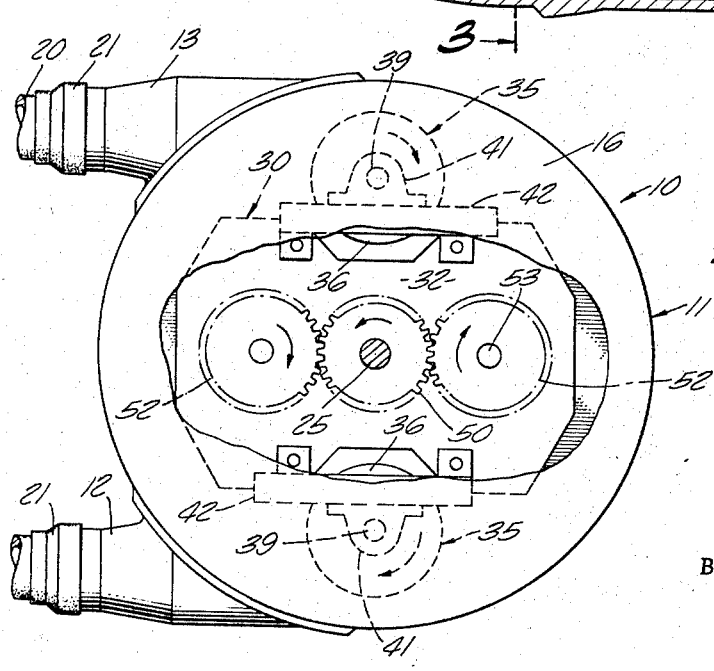
FIGURE 2 is an elevation view of the pump shown in FIGURE 1 taken from the opposite side with a portion of the housing broken away to illustrate the drive means on that side.
Figure 3:
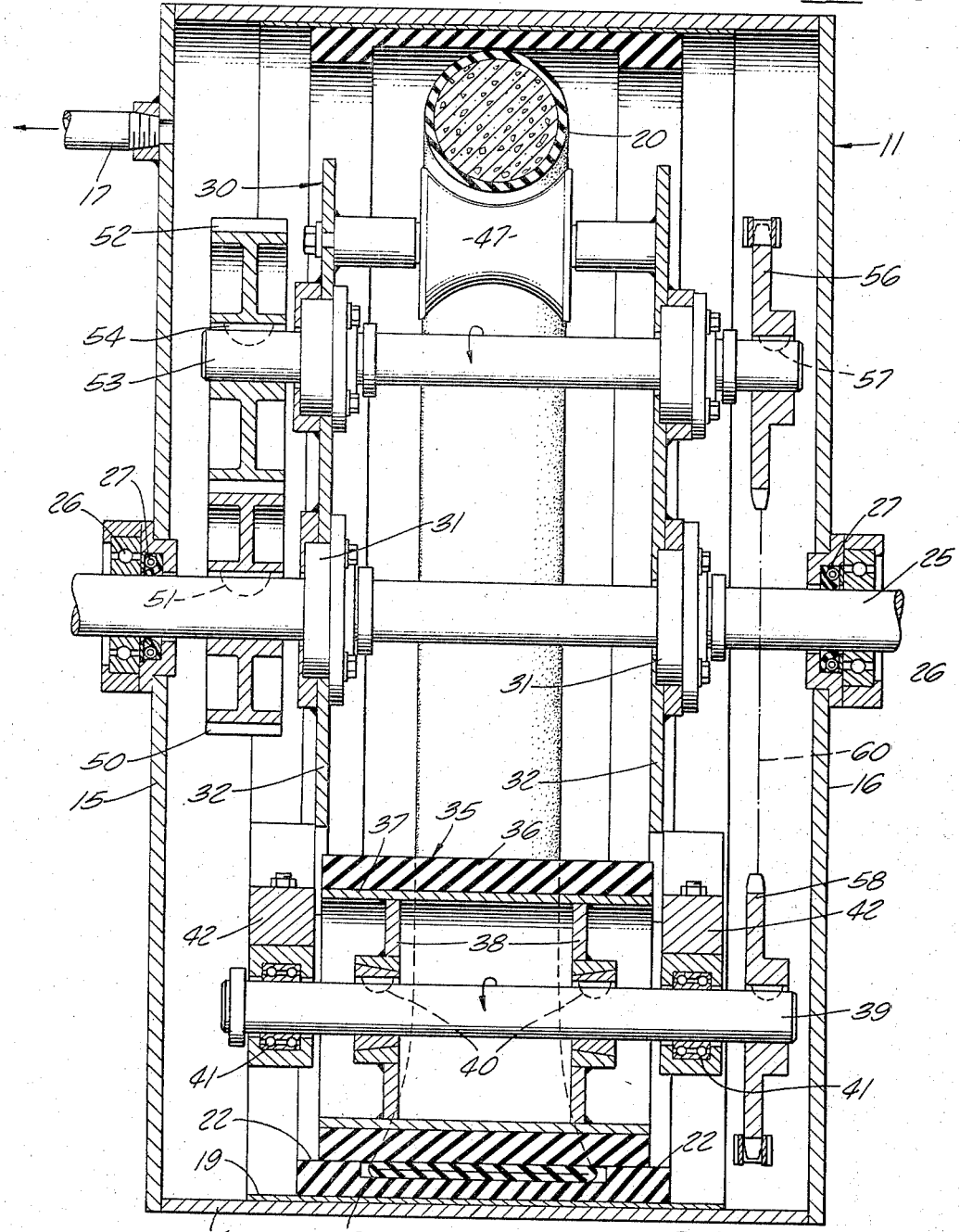
FIGURE 3 is a sectional elevation view of the pump of FIGURE 1 taken substantially on the line 3—3 of FIGURE 1.

Referring now in detail to the drawings and particularly to the embodiment illustrated in FIGURES 1, 2 and 3, the fluid pump of this invention is generally designated 10 and includes a housing 11 of a generally cylindrical shape with a tubular inlet boss 12 and a tubular outlet boss 13. The housing 11 includes a cylindrical wall 14 with circular end walls 15 and 16. The tubular bosses 12 and 13 extend somewhat tangentially from the cylindrical wall 14. The housing 11 is constructed to an air tight condition whereby a vacuum may be drawn on the housing through a tube 17 which is connected to a conventional vacuum pump (not shown) maintaining a vacuum of approximately 22 to 27 inches of mercury during operation of the fluid pump 10. The vacuum created within the housing serves to tend to restore the deformable hose to its natural tubular shape after being compressed during pump operation.

On the interior cylindrical surface of the wall 14 of housing 11 there is mounted a rubber pad 18 for supporting the deformable tube or hose 20, which serves as the compressible pumping chamber of the pump. The mounting of pad 18 may be accomplished by bonding the pad to a steel sheet 19 which is then mounted on the interior of cylindrical wall 14. The deformable hose 20 extends into the housing 11 through inlet tubular boss 12, around the cylindrical surface formed by the rubber pad 18 and then out through the outlet tubular boss 13. The hose 20 may be secured to each of the bosses 12 and 13 by any convenient means (not shown) and a flexible tubular boot 21 on each seals the hose 20 to the boss to prevent air leakage into the housing due to the vacuum. The rubber pad 18 resiliently supports the deformable hose 20 to minimize wear and to avoid punctures that might otherwise occur if a solid particle were trapped in a portion of the hose compressed by the roller. On either side of the hose 20 the rubber pad 18 is provided with inwardly extending rail portions 22 of approximately the thickness of the compressed hose 20. The rail portions 22 are adapted to be engaged by the hose-deforming rollers as will appear more fully hereinafter thereby frictionally assisting the orbital progress of the rollers around the cylindrical housing as the rollers are rotated. Apertures 23 are provided in the rubber pad 18 and supporting steel sheet 19 at the locations of tubular bosses 12 and 13 for the hose 20 to pass therethrough. The short portion of cylindrical wall 14 between the tubular bosses 12 and 13 also is provided with a portion of the rubber pad 18 for engagement by the hose-deforming rollers to assist in driving the rotor in this portion of each revolution. It is to be noted that the hose 20 is not secured to the pad 18 in any manner although it is held in proper centered position by means provided on the rotor and therefore it is a relatively simple task to replace the section of hose 20 positioned within the housing when it becomes worn by merely feeding in a new section after pulling out the old section through the tubular bosses 12 and 13.

Concentric with the cylindrical wall 14 of the housing there is provided a drive shaft 25 rotatably supported by bearings 26 mounted on the end walls 15 and 16. A seal 27 encircles the shaft 25 at each of the end walls 15 and 16 to maintain the vacuum created in the housing 11. In appropriate circumstances where the shaft 25 is rotatably supported by bearing means externally of the housing 11 as might be included in the motive power means, the bearings 26 may be omitted but the seals 27 will be retained. The drive shaft 25 may be driven by any convenient means such as but not limited to hydraulic motors (not shown) mounted on the end walls 15 and 16 and coupled directly to the shaft 25. Such hydraulic motors are driven by fluid supplied from a separate hydraulic pump (not shown) whereby the necessary rotary power is imparted to the shaft 25 but this allows the pump 10 to be stalled or stopped by an obstruction or the like without the drive mechanism being damaged. The input power to shaft 25 may be applied to one or both ends of the shaft as might be convenient in the circumstances.

In order to support the orbiting rollers for progressively and successively deforming the hose 20, a rotor frame which is generally designated 30 is rotatably mounted on the shaft 25 by means of bearings 31. The rotor frame 30 is freely rotatable relative to the shaft 25 for reasons that will become more apparent hereinafter but is positively located in the axial direction by any convenient means.

The frame 30 is comprised generally of a pair of parallel spaced support plates 32 on which the spaced bearings 31 are mounted. For structural integrity a number of cross braces are provided between the plates 32 but these are omitted from the drawings for clarity of illustration of the operating components of the device. The plates 32 are of any convenient shape to accommodate the hereinafter described elements that are mounted thereon.

A pair of rollers, generally designated 35, are mounted on the rotor 30 in a position for deformably engaging the hose 20 during operation of the pump. The rollers 35 include a cylindrical rubber tread or sleeve 36 bounded on a cylindrical rim 37 supported by flanges 38. The flanges 38 are fixed to a shaft 39 by keys 40 or other convenient means for rotation of the roller with the shaft. The shaft 39 is rotatably supported by the spaced bearings 41 which in turn are mounted on blocks 42. Each block 42 is pivotally and releasably secured at one end to the support plate 32 of the rotor 30 by a bolt 43 while the other end is adjustably mounted by a releasable bolt 44 in a slot 45 and an adjusting screw 46. By this arrangement the rollers 35 may be adjusted in or out in the radial direction relative to the drive shaft 25 to make the desired contact with the deformable hose 20 and to compensate for wear over a period of time. The rubber tread or sleeve 36 of the roller is of a width to engage the rail portions 22 of the pad 18 supporting the deformable hose whereby the frictional engagement between sleeve 36 and rails 22 as the rollers 35 are rotated assists in causing the orbital movement of the rollers about the shaft 25 to progressively deform the hose 20. It is to be noted that the thickness of the pad 18 between the two rails 22 is less than the thickness of the rails 22 by an amount approximately equal to twice the wall thickness of the deformable hose 20 whereby the walls of the hose are squeezed together as shown in the lower portion of FIGURE 3 as the roller passes therealong. In the embodiment illustrated there is provided two rollers 35 diametrically spaced and since the hose 20 is in contact with approximately 180° of the cylindrical surface of pad 18, there is always one roller 35 in contact with that portion of the hose 20 to force fluid through the hose. While the fluid pump 10 is illustrated with two rollers 35 it will readily appear to those skilled in the art that one roller could be used if the deformable hose extended the full 360° of the housing or even additional rollers may be used where the particular conditions so dictate all without departing from this invention.

In order to hold the hose 20 in proper lateral position relative to the pad 18 for engagement and compression by the rollers 35, hose follower rollers 47 are mounted on the rotor 30 at locations circumferentially between the rollers 35. In the embodiment illustrated four follower rollers 47 have been found adequate when located as shown in FIGURE 1. The follower rollers 47 are spool shaped having a concave surface for fitting the exterior of the hose 20. The follower rollers 47 are spaced from the pad 18 an appropriate distance for preventing the hose 20 from moving laterally out of the concave surface of the follower roller but not necessarily so close as to provide continual engagement of the roller 47 with the hose 20. Follower rollers 47 eliminate the need for straps and similar arrangements used in prior art devices for affirmatively holding the hose 20 in place with respect to the housing 11.

Means are provided for causing a positive rotational drive of the rollers 35 upon rotation of the drive shaft 25 in a manner whereby the shaft 25 and rotor 30 are rotated in the same direction while the rollers 35 are rotated in the opposite direction for reasons that will become more apparent hereinafter. The drive means may include a spur gear 50 fixed by a key 51 to the shaft 25 between the rotor 30 and one end wall 15 of the housing. A pair of spur gears 52 mesh with gear 50 on either side thereof and are fixed to shafts 53 by keys 54. The shafts 53 are rotatably mounted on the rotor 30 by spaced bearings 55 and it is to be noted that the shafts 53 rotate in the opposite direction as the rotation of drive shaft 25 due to the spur gear drive connection. A speed reduction may be accomplished between gears 50 and 52 by providing a gear 50 which is smaller than gears 52, as shown, or any other spaced relationship between shafts 25 and 53 may be accomplished as is desirable in the particular embodiment. On the opposite side of rotor 30 from the spur gears a sprocket 56 is mounted on each shaft 53 and fixed thereto by a key 57. Another sprocket 58 is affixed to the shaft 39 of each roller 35 by a key 59 and a separate roller chain 60 connects one sprocket 56 to one sprocket 58. The most desirable orientation of shafts 39 and 53 is approximately 90° apart around the drive shaft 25 as shown in FIGURE 1 whereby the drive chains 60 do not interfere with each other. A chain tensioning sprocket 61 is mounted on the rotor 39 in an adjustable manner adjacent each of the chains 60 for engagement with the chains to maintain the proper tension in the chains 60 and yet permit radial adjustment of the rollers 35 as heretofore described.

Since the drive between shafts 53 and 39 are chain drives their direction of rotation is the same and in turn due to the spur gear drive the rotation of roller shaft 39 is opposite to the rotation of drive shaft 25. In other words, since the rollers 35 rotate in an orbiting or planetary motion about the drive shaft 25, the direction of rotation of the supporting rotor 30 must be opposite to the rotation of rollers 35 but results in rotation in the same direction as drive shaft 25. The first and most apparent advantage in this relationship rather than opposite rotation of shaft 25 and rotor 30 is the reduction in friction and wear between the drive shaft and rotor since they are rotating in the same direction although at different speeds. Further, any friction between drive shaft 25 and rotor 30 tends to rotate the rotor in the desired direction. This arrangement also produces the unique result under operating conditions that as a roller 35 compresses the hose 20 and encounters an obstruction or excessive pressure tending to produce a "stall" condition the drive arrangement tends to rotate the rotor 30 directly thereby urging the rollers 35 along the hose. Heretofore conventional fluid pumps of this type having powered rollers but opposite rotation between the drive shaft and rotor actually tend to rotate the rotor in the wrong direction under stalled conditions thereby opposing the rotor-rotating forces produced by the rollers and resulting in the rollers slipping on and wearing the hose. In this near stall condition of the pump of this invention the drive arrangement advantageously simulates a "rotor drive" type pump in the stall condition thereby minimizing roller slippage and yet the other well known advantages of a "rotor drive" type fluid pump are not sacrificed. The rotor drive effect produced by this arrangement may best be observed by reference to FIGURE 2 by considering the rollers 35 to be stalled whereby through the chains 60 the spur gears 52 are stalled (i.e. virtually fixed relative to the rotor 30) then it may be seen that the spur gear 50 tends to push down on the left gear 52 and up on the right gear 52 to cause counterclockwise rotation of rotor 30 which is the desired direction of rotor rotation. As rotation of rotor 30 is produced of course rollers 35 are rotated to progress along hose 30.

Figure 6:
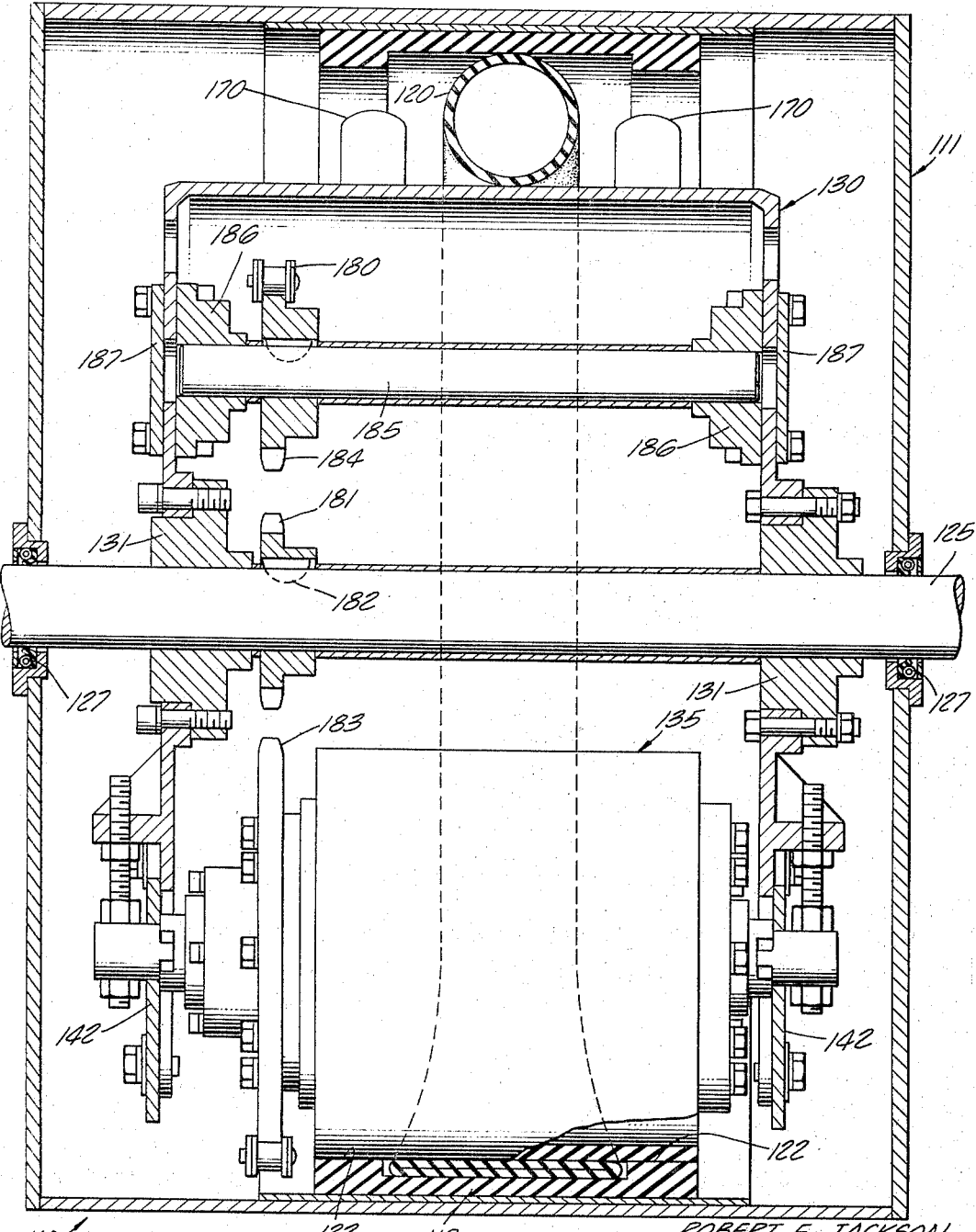
FIGURE 6 is a sectional elevation view of the fluid pump of FIGURE 4 taken substantially on the line 6—6 of FIGURE 4.

Referring now to FIGURES 4, 5 and 6, there is illustrated a modified embodiment of the fluid pump, generally designated 110, which is substantially similar to the aforedescribed fluid pump 10 with the notable exception of the roller drive arrangement employed and therefore any components of fluid pump 110 which are substantially identical to those of pump 10 will be only briefly mentioned and identified by a numeral one hundred digits larger than the identifying numeral used with respect to the component of fluid pump 10. The fluid pump 110 includes a cylindrical housing 111 with an inlet boss 112 and outlet boss 113 through which the deformable hose 120 passes. The interior of housing 111 is provided with the hose supporting rubber pad 118 having rail portions 122 which are frictionally engaged by the hose deforming rollers 135. The drive shaft 125 is rotatably mounted in the housing 111 and sealed therewith by seals 127. Again the drive shaft 125 may be driven by any convenient means not pertinent to this invention. A rotor frame generally designated 130 is rotatably mounted on shaft 125 by bearings 131 and is axially located along the shaft by any convenient means. Each hose deforming roller 135 is mounted on a block 142 which is in turn adjustably mounted on the rotor 130 for adjustment in the radial direction to compensate for roller wear or the like. In order to keep the hose 120 in the proper lateral position, this embodiment employs a pair of spaced guides 170 mounted on the rotor 130 at a couple of locations circumferentially spaced between the rollers 135 rather than the follower rollers 47 heretofore described although the functional result is the same. Rather than the two stage gear and chain drive employed in fluid pump 10 the fluid pump 110 employs a single continuous roller chain 180 reeved about sprockets on various shafts to produce rotation of the drive shaft 125 and rotor 130 in the same direction and opposite rotation of the rollers 135. A drive sprocket 181 is mounted on drive shaft 125 and affixed thereto by a key 182. The location of sprocket 181 may be within rotor 130 as shown. A sprocket 183 is mounted on each of the rollers 135 for driving rotation thereof and is positioned in an alignment with sprocket 181. An idler sprocket 184 is fixed to a shaft 185 rotatably supported by bearings 186. The roller chain 180 has one side engaging the drive sprocket 181 and is reeved in a manner whereby the other side of roller chain 180 engages the driven sprockets 183 thereby causing a reversal in the direction of rotation from sprocket 181 to sprockets 183. The idler sprocket 184 serves to wrap the chain 180 around a sufficient peripheral portion of the drive sprocket 181 to constitute a practical driving relationship, that is, with a sufficient number of teeth of sprocket 181 engaging the roller chain. Further the shaft 185 supporting idler sprocket 184 is supported by bearings 186 which are in turn mounted on adjustably movable blocks 187 supported on roller 130 for adjusting the tension in chain 180. Thus it may be seen as viewed in FIGURE 4 that clockwise rotation of drive shaft 125 and sprocket 181 will produce counterclockwise rotation of sprockets 183 and rollers 135 thereby resulting in clockwise rotation of rotor 130. Again the result is that the drive shaft 125 and rotor 130 rotate in the same direction and that upon approaching stalled conditions of rollers 135 the drive through chain 180 tends to cause rotation of rotor 130 in the desired direction in addition to the forces applied through the rollers 135. This may qualitatively be illustrated by considering that the upper roller 135 in FIGURE 4 is tending to stall thereby fixing it relative to the rotor 130 and therefore extreme tension will be applied through the short section of chain 180 between sprocket 181 and upper sprocket 183 tending to pull the rotor 130 in the clockwise direction. This drive arrangement is somewhat simpler than the arrangement of FIGURES 1, 2 and 3 since only a single chain drive is required but on the other hand the versatility is somewhat more limited as for example in producing a large speed reduction between shaft 125 and the rollers 135. In the fluid pump 10 of FIGURES 1, 2 and 3 a speed reduction may be accomplished in both the spur gear stage and in the chain transmission stage whereas only a single reduction is possible in the serpentine chain drive of fluid pump 110.

Although this invention has been described in connection with two specific embodiments of fluid pumps it is to be understood that the invention is not limited to such embodiments but rather is of the full scope of the appended claims.

We claim:
1. In a fluid pump, the combination of; a housing having a cylindrical inner surface portion, a deformable hose mounted in said housing along said cylindrical surface portion, a drive shaft rotatably mounted in the housing concentric with said cylindrical surface, a rotor having bearing means rotatably mounting and supporting said rotor on said shaft, at least one roller rotatably mounted on said rotor for engaging and deforming said hose against said cylindrical surface to force fluid through the hose, means for adjusting the radial position of said roller for providing proper engagement between said roller and hose, and drive means connecting said roller to said drive shaft for causing orbiting rotation of the roller in the direction opposite the rotation of said drive shaft to engage and roll along said hose for in turn causing rotation of said rotor in the same direction as said drive shaft for producing driven rotor rotation upon stalling of said roller, said drive means including means for allowing said radial adjustment of said roller relative to said rotor and central drive shaft.

2. The fluid pump of claim 1 in which said drive shaft rotates at a rate a substantial proportion faster than the rate of rotation of said rotor except in the roller stalling condition where the rates are the same.

3. The fluid pump of claim 1 in which said drive means includes a reduction in the speed of rotation from said drive shaft to said roller.

4. The fluid pump of claim 1 in which said drive means is comprised of mechanical elements for producing a positive drive between said drive shaft and roller.

5. The fluid pump of claim 4 in which at least one of said elements is rotatably mounted on said rotor in addition to and separate from said roller.

6. The fluid pump of claim 1 in which said cylindrical inner surface portion of said housing includes a portion on at least one lateral side of said hose engaged directly by said roller for assisting in causing the orbital travel of said roller along said hose.

7. The fluid pump of claim 1 in which guide means are mounted on said rotor circumferentially displaced from said roller for laterally locating and positioning the said hose and comprises the sole means for so locating and positioning the hose along said circumferential surface.

8. The fluid pump of claim 7 in which said guide means comprise spool-shaped follower rollers in juxtaposition to said hose.

9. The fluid pump of claim 1 in which said drive means includes a drive gear fixedly mounted on said drive shaft, gear means rotatably mounted on said rotor and meshing with said drive gear for reversing the direction of rotation, and a chain drive between the said gear means and said roller for rotating said roller.

10. The fluid pump of claim 9 in which two diametrically spaced rollers are provided and said gear means includes a separate gear for each roller, and a separate chain drive from each said separate gear to a separate roller.

11. The fluid pump of claim 1 in which said drive means is comprised of a drive sprocket fixedly mounted on said drive shaft, a driven sprocket fixedly mounted on said roller, and one continuous chain reeved about said sprockets with one side thereof engaging said drive sprocket and the other side engaging said said driven sprocket for reversing the direction of rotation from said drive shaft to said roller.

12. The fluid pump of claim 11 in which an idler sprocket is rotatably and adjustably mounted on said rotor and engages said chain for causing substantial peripheral contact of said chain with said drive sprocket.

13. In an improved fluid pump of the type employing a deformable hose mounted in a cylindrical housing, a central drive shaft in the housing with a rotor mounted on said shaft, and at least one roller mounted on the rotor for engaging and deforming said hose for forcing fluid therethrough; the improvement comprising, bearing means rotatably mounting and supporting said rotor on said drive shaft, means for adjusting the radial position of said roller for providing proper engagement between said roller and hose, and drive means connecting the said roller to said drive shaft for causing orbiting rotation of the rollers in the opposite direction of said drive shaft for in turn causing rotation of said rotor frame in the same direction as said drive shaft for producing driven rotor rotation upon approaching stalling of said roller, said drive means including means for allowing said radial adjustment of said roller relative to said rotor and central drive shaft.

14. The fluid pump of claim 13 in which said drive means is comprised of mechanical elements for producing a positive drive between said drive shaft and roller.

15. The fluid pump of claim 14 in which at least one of said elements is rotatably mounted on said rotor in addition to and separate from said roller.

16. The fluid pump of claim 13 in which said drive means includes a drive gear fixedly mounted on said drive shaft, gear means rotatably mounted on said rotor and meshing with said drive gear for reversing the direction of rotation, and a chain drive between the said gear means and said roller for rotating said roller.

17. The fluid pump of claim 16 in which at least two rollers are provided, said gear means includes a separate gear for each roller, and a separate chain drive is provided from each said separate gear to a separate roller.

18. The fluid pump of claim 13 in which said drive means is comprised of a drive sprocket fixedly mounted on said drive shaft, a driven sprocket fixedly mounted on each said roller, and a continuous chain reeved about said sprockets with one side thereof engaging said drive sprocket and the other side engaging said driven sprocket for reversing the direction of rotation from said drive shaft to said roller.

19. The fluid pump of claim 18 in which an idler sprocket is rotatably and adjustably mounted on said rotor and engages said chain for causing substantial peripheral contact of said chain with said drive sprocket.

20. In a fluid pump, the combination of: a housing having a cylindrical inner surface, a rubber pad mounted on said surface and having inwardly projecting and spaced rail portions, a deformable hose mounted in said housing with a portion positioned circumferentially along said rubber pad cylindrical surface between said rail portions, said hose having ends extending out of said housing as fluid intake and discharge, a drive shaft rotatably mounted in the housing concentric with said cylindrical surface, a rotor frame having bearing means rotatably mounting said rotor on said shaft, at least one roller rotatably mounted on said rotor frame and having an exterior rubber surface for engaging both said rail portions and said hose for deforming said hose against said cylindrical surface to force fluid through the hose as the roller progresses therealong, means on said rotor frame for adjusting the said roller radially for causing a predetermined contact and engagement with said hose and rail portions, and mechanical drive means connecting the said roller to said drive shaft for causing orbiting rotation of the roller in the opposite direction of said drive shaft for said engagement with said hose and rail portions to cause rolling movement of said roller therealong and for in turn causing rotation of said rotor frame in the same direction as said drive shaft for producing driven rotor relationship upon approaching stalling of the progress of the roller and any tendency of the roller to slip, said drive means including means for allowing said radial adjustment of said roller relative to said rotor and central drive shaft.

21. The fluid pump of claim 20 in which two rollers are provided in diametrically spaced positions on said rotor and said hose extends along approximately 180° of said cylindrical surface.

(References on following page)

References Cited

UNITED STATES PATENTS

| | | | |
|---|---|---|---|
| 1,927,831 | 9/1933 | Hild | 103—212 |
| 2,899,907 | 8/1959 | Becher | 103—149 |
| 3,249,059 | 5/1966 | Renn | 103—149 |
| 3,358,609 | 12/1967 | Worth et al. | 103—149 |

FOREIGN PATENTS 1,351,813  12/1963  France.

DONLEY J. STOCKING, *Primary Examiner.*
W. J. GOODWIN, *Assistant Examiner.*

U.S. Cl. X.R.

103—212